(12) United States Patent
Yeom et al.

(10) Patent No.: US 12,311,904 B2
(45) Date of Patent: May 27, 2025

(54) BRAKING CONTROL SYSTEM AND METHOD FOR AUTONOMOUS VEHICLE

(71) Applicants: Hyundai Motor Company, Seoul (KR); Kia Corporation, Seoul (KR)

(72) Inventors: Myung Ki Yeom, Whasung-Si (KR); In Su Kim, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 271 days.

(21) Appl. No.: 17/966,018

(22) Filed: Oct. 14, 2022

(65) Prior Publication Data
US 2023/0182696 A1 Jun. 15, 2023

(30) Foreign Application Priority Data
Dec. 15, 2021 (KR) .......................... 10-2021-0179263

(51) Int. Cl.
 *B60T 8/88* (2006.01)
 *B60Q 9/00* (2006.01)
 *B60T 7/22* (2006.01)
(52) U.S. Cl.
 CPC ............... *B60T 7/22* (2013.01); *B60Q 9/008* (2013.01); *B60T 8/885* (2013.01); *B60T 2210/32* (2013.01); *B60T 2250/04* (2013.01)
(58) Field of Classification Search
 CPC .......... B60W 50/02; B60W 2050/021; B60W 2050/0215; B60W 30/16; B60Y 2306/15; B60T 7/22; B60T 8/885; B60T 2210/32; B60T 2250/04; B60T 17/22; B60Q 9/008
 See application file for complete search history.

(56) References Cited

U.S. PATENT DOCUMENTS

| 9,555,740 B1* | 1/2017 | Zhu ........................ G01D 18/00 |
| 2013/0165146 A1* | 6/2013 | Stahlins ..................... G01S 3/30 |
| | | 455/456.1 |
| 2013/0278441 A1* | 10/2013 | Rubin ..................... H04W 4/48 |
| | | 340/905 |
| 2018/0043896 A1* | 2/2018 | Lee ................. B60W 30/18127 |
| 2019/0027045 A1* | 1/2019 | Laur ..................... B60W 30/16 |
| 2020/0209883 A1* | 7/2020 | Kim ..................... G05D 1/0088 |

(Continued)

FOREIGN PATENT DOCUMENTS

| CN | 111288984 A | * | 6/2020 | .......... G01C 21/005 |
| DE | 102018217000 A1 | * | 4/2020 | |

(Continued)

*Primary Examiner* — Khoi H Tran
*Assistant Examiner* — Dairon Estevez
(74) *Attorney, Agent, or Firm* — Morgan, Lewis & Bockius LLP (57) ABSTRACT

A braking control system and method for an autonomous vehicle, may transmit information on surrounding vehicles monitored by autonomous traveling-related sensors of each vehicle while the autonomous vehicles are traveling to the cloud, and transmit a braking induction signal to a specific vehicle when the cloud determines that a distance with a leading vehicle of the specific vehicle has reached a reference distance or less at which braking is required so that the specific vehicle may be braked, checking occurrence of an error or a failure of autonomous traveling-related sensors of a specific vehicle, and easily preventing the safety accidents such as collision with the leading vehicle.

16 Claims, 9 Drawing Sheets

(56) References Cited

U.S. PATENT DOCUMENTS

| | | | |
|---|---|---|---|
| 2021/0362733 A1* | 11/2021 | Yoon | H04N 17/00 |
| 2022/0196849 A1* | 6/2022 | Chen | G01S 19/51 |
| 2023/0288211 A1* | 9/2023 | Rech | B60W 60/001 |

FOREIGN PATENT DOCUMENTS

| | | | |
|---|---|---|---|
| JP | 3557834 B2 * | 8/2004 | |
| KR | 101914624 B1 * | 11/2018 | |

* cited by examiner

BRAKING CONTROL SYSTEM AND METHOD FOR AUTONOMOUS VEHICLE

CROSS-REFERENCE TO RELATED APPLICATION

The present application claims priority to Korean Patent Application No. 10-2021-0179263 filed on Dec. 15, 2021, the entire contents of which is incorporated herein for all purposes by this reference.

BACKGROUND OF THE PRESENT DISCLOSURE

Field of the Present Disclosure

The present disclosure relates to a braking control system and method for an autonomous vehicle, and more specifically, to a braking control system and method for an autonomous vehicle, which may prevent a phenomenon in which a braking is not performed in a situation in which deceleration is required due to occurrence of failure of an autonomous traveling-related sensor.

Description of Related Art

When autonomous vehicles do platooning in a certain road area, each vehicle is accelerated and decelerated based on information detected by autonomous traveling-related sensors such as cameras, radio detection and rangings (RADARs) or light imaging detection and rangings (LIDARs), and thus perform autonomous traveling while maintaining a predetermined interval.

When the autonomous traveling-related sensors mounted on one or more of a plurality of autonomous vehicles are erroneous or failed, braking may not be accurately performed in a situation in which deceleration is required, so that collision accidents with the leading vehicles may occur.

Accordingly, there is a demand for a method configured for preventing safety accidents by identifying that vehicles not recognizing a braking situation exists while autonomous vehicles are traveling and inducing deceleration of the identified vehicles.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a braking control system and method for an autonomous vehicle, which may transmit information on surrounding vehicles monitored by autonomous traveling-related sensors of the respective vehicles while the autonomous vehicles are traveling to a cloud, and transmit a braking induction signal to a specific vehicle when it is determined in the cloud that a distance with a leading vehicle of the specific vehicle has reached a reference distance or less at which a braking is required so that the braking of the specific vehicle may be performed, checking occurrence of error or failure of the autonomous traveling-related sensor of the specific vehicle, and easily preventing safety accidents such as collision with the leading vehicle.

an exemplary embodiment of the present disclosure provides an autonomous traveling detection unit mounted on each of autonomous vehicles to monitor surrounding vehicles required for autonomous traveling; an autonomous traveling control unit configured to determine absolute information including an absolute location of each of the autonomous vehicles based on monitoring information of the autonomous traveling detection unit to transmit the absolute information so determined to a cloud; and the cloud configured to determine whether the autonomous traveling detection unit of each of the autonomous vehicles is erroneous and failed using an average value of the absolute locations of the autonomous vehicles, and then transmit a failure signal or an error correction request signal of the autonomous traveling detection unit together with a braking request signal to the autonomous traveling control unit of each of autonomous vehicles which have failed.

The autonomous traveling control unit is configured to determine absolute information including absolute locations and absolute speeds of the surrounding vehicles using a rotation matrix based on relative information including relative locations and relative speeds of the surrounding vehicles and absolute information including an absolute location and an absolute speed of the surrounding vehicles, and then transmit the determined absolute information together with the relative information on the surrounding vehicles to the cloud.

The cloud is configured to align absolute locations transmitted by the autonomous traveling control unit of each of the autonomous vehicles by distance relative to the average value of the absolute locations, and then determine that an autonomous traveling detection unit of any of the plurality of autonomous vehicles having transmitted an absolute location deviating from the average value by a reference distance or more than the reference distance is erroneous or failed.

When an error rate of the autonomous traveling detection unit of the autonomous vehicle having transmitted the absolute location deviating from the average value of the absolute location by the reference distance or more than the reference distance is greater than a preset threshold, the cloud is configured to conclude that the autonomous traveling detection unit of a corresponding autonomous vehicle is failed to transmit a failure signal of the autonomous traveling detection unit to the autonomous traveling control unit of the corresponding autonomous vehicle.

On the other hand, when an error rate of the autonomous traveling detection unit of the autonomous vehicle having transmitted the absolute location deviating from the average value of the absolute location by the reference distance or more than the reference distance is smaller than a preset threshold, the cloud is configured to transmit the error correction request signal of the autonomous traveling detection unit to the autonomous traveling control unit of the corresponding autonomous vehicle.

The cloud is configured to determine an inter-vehicle collision index (distance reduction rate/distance with a leading vehicle), and transmit the braking request signal to the autonomous traveling control unit of the corresponding autonomous vehicle when the inter-vehicle collision index is greater than a vehicle safety threshold.

When the autonomous traveling control unit receives the failure signal of the autonomous traveling detection unit from the cloud, the autonomous traveling control unit is configured to display a warning to switch to a manual operation on a display mounted in the vehicle.

Furthermore, when the autonomous traveling control unit receives the error correction request signal of the autonomous traveling detection unit from the cloud, the autonomous traveling control unit is configured to correct an offset value of the autonomous traveling detection unit based on error information included in the error correction request signal.

Furthermore, when the autonomous traveling control unit receives the braking request signal from the cloud, the autonomous traveling control unit is configured to transmit the braking request signal to a braking control unit to perform a regenerative braking by a motor and a hydraulic braking by a hydraulic braking device.

Another exemplary embodiment of the present disclosure provides a braking control method for an autonomous vehicle including monitoring surrounding vehicles required for autonomous traveling by an autonomous traveling detection unit mounted on autonomous vehicles; determining absolute information including absolute locations of each autonomous vehicle based on monitoring information of the autonomous traveling detection unit to transmit the determined absolute information to a cloud, by an autonomous traveling control unit; and determining whether the autonomous traveling detection unit of each autonomous vehicle is erroneous or failed using an average value of the absolute locations of each autonomous vehicle, and then transmitting a failure signal or an error correction request signal of the autonomous traveling detection unit together with a braking request signal to the autonomous traveling control unit of the corresponding autonomous vehicle, by a cloud.

When determining whether the autonomous traveling detection unit of each autonomous vehicle is erroneous or failed, the absolute locations transmitted by the autonomous traveling control unit of each autonomous vehicle are aligned by distance based on the average value of the absolute locations of each autonomous vehicle, and then it is determined that an autonomous traveling detection unit of an autonomous vehicle having transmitted an absolute location deviating from the average value by a reference distance or more than the reference distance is erroneous or failed.

When an error rate of the autonomous traveling detection unit of the autonomous vehicle having transmitted the absolute location deviating from the average value of the absolute location by the reference distance or more than the reference distance is greater than a preset threshold, it is determined that the autonomous traveling detection unit of the corresponding autonomous vehicle is failed.

On the other hand, when an error rate of the autonomous traveling detection unit of the autonomous vehicle having transmitted the absolute location deviating from the average value of the absolute location by the reference distance or more than the reference distance is smaller than a preset threshold, it is determined that an error correction of the autonomous traveling detection unit for the autonomous traveling control unit of the corresponding autonomous vehicle is required.

When the cloud transmits the braking request signal to the autonomous traveling control unit, the cloud determines an inter-vehicle collision index (distance reduction rate/distance with a leading vehicle), and transmits the braking request signal to the autonomous traveling control unit of the corresponding autonomous vehicle when the inter-vehicle collision index is greater than a vehicle safety threshold.

The braking control method for an autonomous vehicle according to an exemplary embodiment of the present disclosure further includes displaying a warning to switch to a manual operation on a display mounted in the vehicle when the autonomous traveling control unit receives a failure signal of the autonomous traveling detection unit from the cloud, correcting an offset value of the autonomous traveling detection unit based on error information included in the error correction request signal when the autonomous traveling control unit receives the error correction request signal of the autonomous traveling detection unit from the cloud, and transmitting the braking request signal to a braking control unit to perform a regenerative braking by a motor and a hydraulic braking by a hydraulic braking device when the autonomous traveling control unit receives the braking request signal from the cloud.

Through the above configuration, the present disclosure provides the following effects.

First, it is possible to transmit information on surrounding vehicles monitored by autonomous traveling-related sensors of the respective vehicles while the autonomous vehicles are traveling to the cloud, and transmit the braking induction signal to the specific vehicle when it is determined in the cloud that the distance with the leading vehicle of the specific vehicle has reached a reference distance or less at which the braking is required so that the braking of the specific vehicle may be performed, easily preventing safety accidents such as collision with the leading vehicle.

Second, when the specific vehicle receives the braking induction signal from the cloud, the owner of the specific vehicle can take follow-up maintenance actions and the like by recognizing the occurrence of error or failure of the autonomous traveling-related sensors.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels determined from resources other than petroleum). As referred to herein, a hybrid automotive is an automotive that has two or more sources of power, for example both gasoline-powered and electric-powered automotives.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, exemplary embodiments of the present disclosure will be described in detail with reference to the accompanying drawings.

Figure 1:
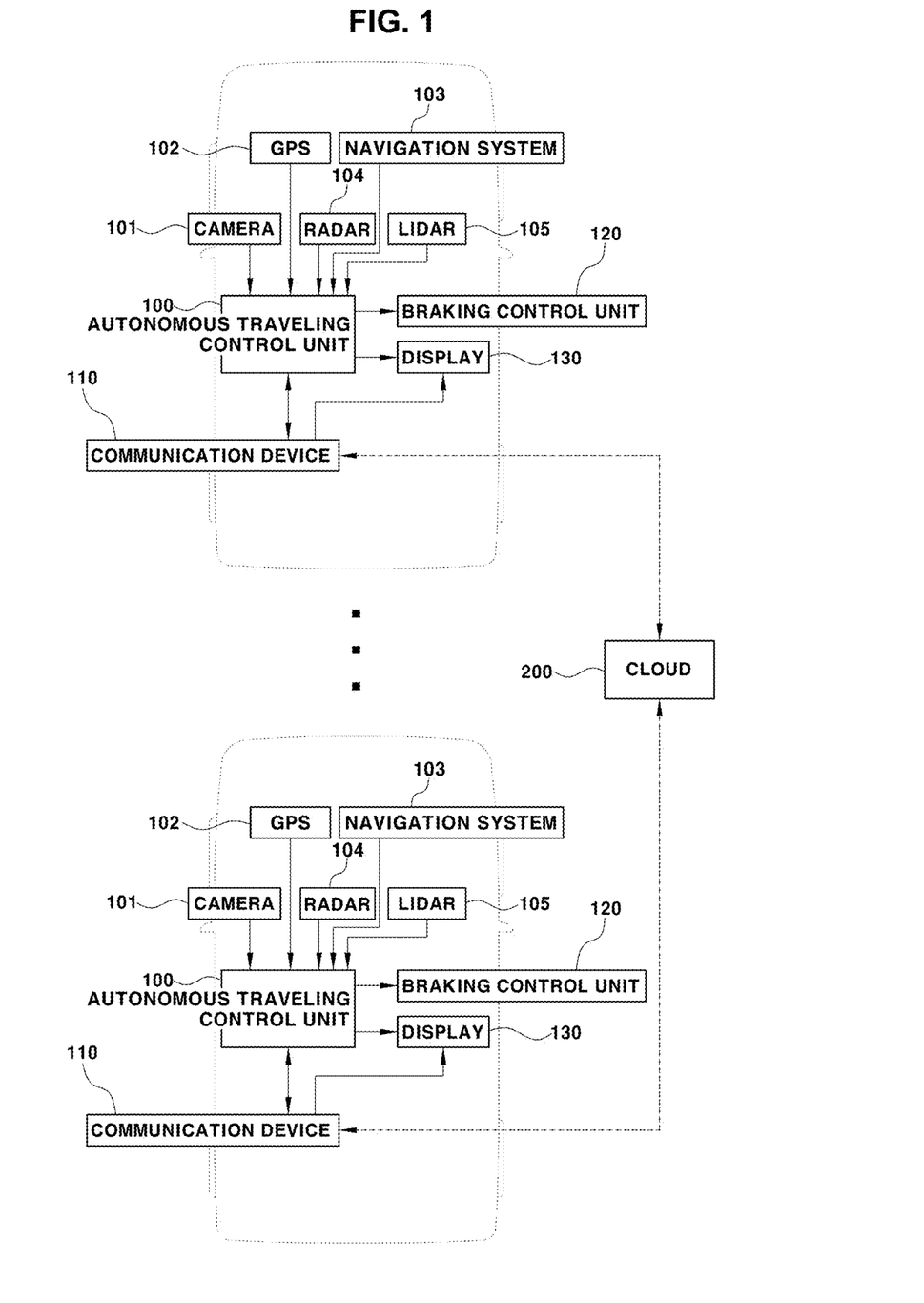
FIG. 1 is a schematic diagram showing a braking control system for an autonomous vehicle according to an exemplary embodiment of the present disclosure.

FIG. 1 is a schematic diagram showing a braking control system for an autonomous vehicle according to an exemplary embodiment of the present disclosure.

As shown in FIG. 1, the autonomous vehicle is mounted with a communication device 110 communicatively connected to an Internet network, also mounted with an autonomous traveling control unit 100 configured to control an overall traveling of the autonomous vehicle, and mounted with a braking control unit 120 configured to decelerate the vehicle according to a braking request signal of the autonomous traveling control unit 100.

As is well known, the autonomous traveling control unit 100 may be configured to receive monitoring information required for autonomous traveling from an autonomous traveling detection unit including a camera 101, a Global Positioning System (GPS) 102, a navigation system 103, a radio detection and ranging (RADAR) 104, or a light imaging detection and ranging (LIDAR) 105 mounted on the vehicle, and control the overall traveling including a traveling direction, acceleration, deceleration, etc. of the vehicle based on the monitoring information.

For reference, the RADAR 104 refers to a sensor configured for transmitting an electromagnetic wave (RF) signal to analyze receiving waves reflected from a target to find out information on an object, and the LIDAR 105 refers to a sensor configured for identifying a location of an object by measuring a time difference between laser pulses striking a subject and returning again.

Figure 2:
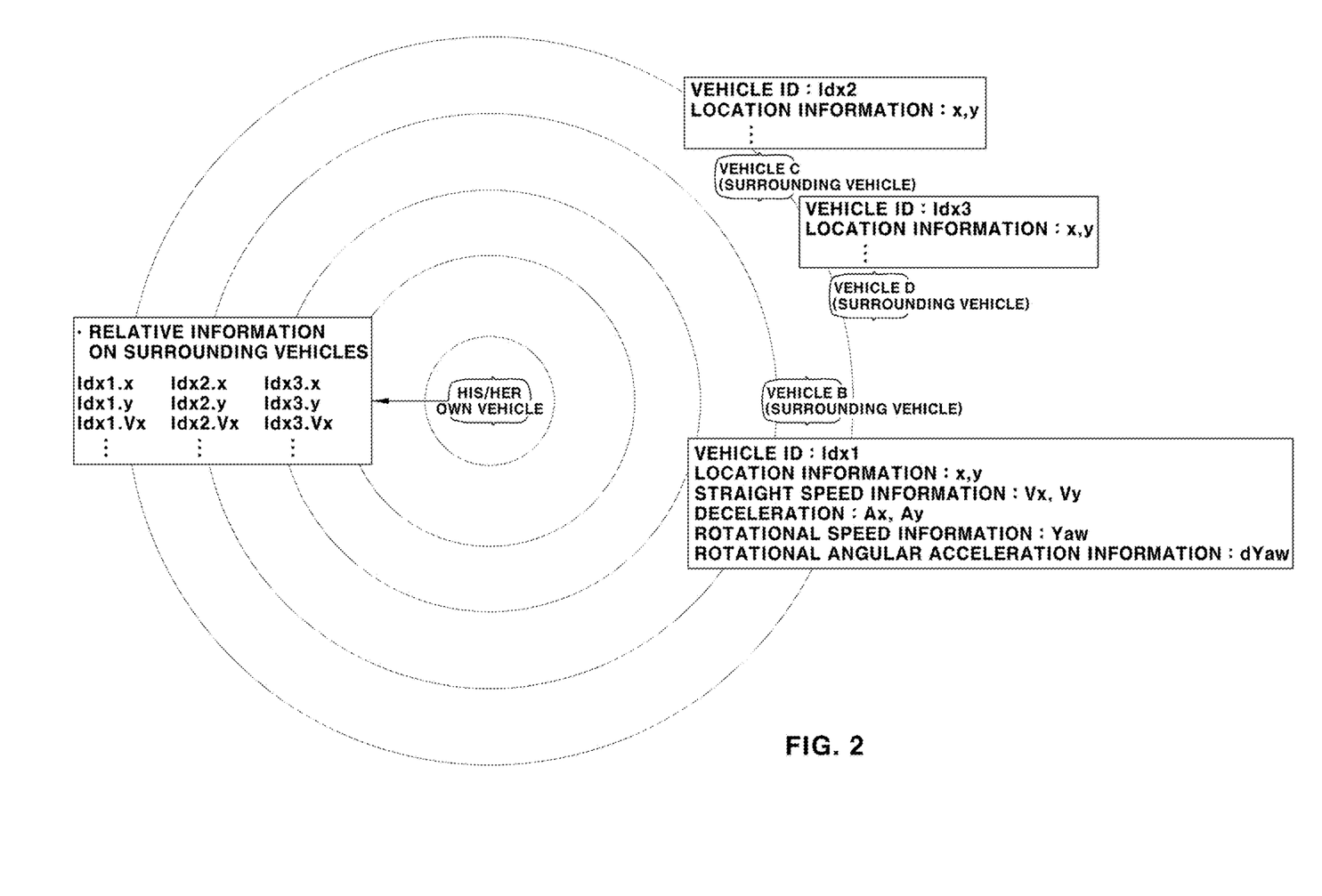
FIG. 2 is a schematic diagram showing an example in which an autonomous traveling control unit of the configuration of the braking control system for an autonomous vehicle according to an exemplary embodiment of the present disclosure identifies and indexes relative information on surrounding vehicles.

The autonomous traveling control unit 100 is configured to receive a monitoring signal for surrounding vehicles from the camera 101 and the RADAR 104 or the LIDAR 105, and assign identifications (IDs) for the respective surrounding vehicles with respect to his or her own vehicle based on the monitoring signal, but as shown in FIG. 2, assign the IDs in order from the nearest surrounding vehicle, and identify and index relative information including relative locations (x, y), relative speeds (Vx, Vy), deceleration (Ax, Ay), a rotation speed (Yaw), a rotational angular acceleration (dYaw), etc. For each surrounding vehicle with the ID assigned.

For example, as shown in FIG. 2, the autonomous control unit 100 may be configured to assign an idx1 to a vehicle B (surrounding vehicle), assign an idx2 to a vehicle C (surrounding vehicle), assign an idx3 to a vehicle D (surrounding vehicle) in order from the nearest vehicle from a vehicle A (his or her own vehicle), and then identify the relative information including relative locations (x, y), relative speeds (Vx, Vy), decelerations (Ax, Ay), a rotation speed (Yaw), a rotational angular acceleration (dYaw), etc. for each surrounding vehicle with the ID assigned, and index each relative information in a predetermined order.

Furthermore, the autonomous traveling control unit 100 may identify an absolute location of his or her own vehicle based on a signal provided by the GPS 102 and the like as absolute information of his or her own vehicle, identify an absolute vehicle speed of his or her own vehicle based on a detection signal provided from a vehicle speed sensor 106, and identify a heading angle of his or her own vehicle based on the detection signal provided by a yaw sensor 107.

For reference, the heading angle refers to an angle at which a vehicle faces with respect to a global coordinate system.

Figure 3:
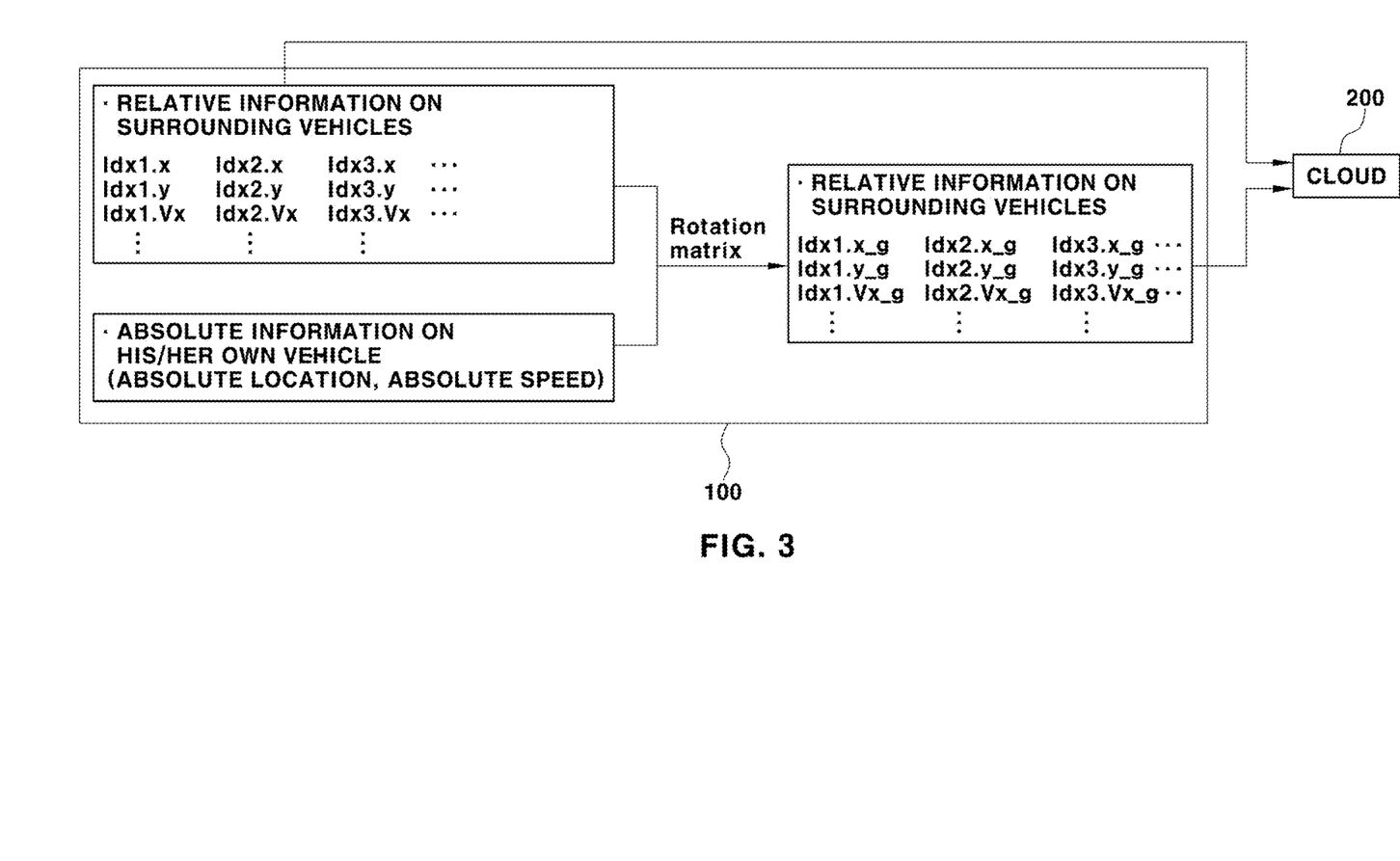
FIG. 3 is a schematic diagram showing an example in which the autonomous traveling control unit of the configuration of the braking control system for an autonomous vehicle according to an exemplary embodiment of the present disclosure indexes relative information and absolute information on surrounding vehicles and transmits the indexed information to a cloud.

Furthermore, the autonomous traveling control unit 100 is configured to determine absolute information on the surrounding vehicles using a general rotation matrix based on the relative information on the surrounding vehicles and absolute information on his or her own vehicle, and then transmit the determined absolute information on the surrounding vehicles together with the relative information on the surrounding vehicles to a cloud 200.

The autonomous traveling control unit 100 may be configured to determine absolute locations (x_g, y_g), absolute velocities (Vx_g, Vy_g), absolute accelerations (Ax_g, Ay_g), etc. as the absolute information on the surrounding vehicles using the general rotation matrix based on the relative information including the relative locations (x, y), the relative velocities (Vx, Vy), and the decelerations (Ax, Ay) for the surrounding vehicles and the absolute information including the absolute location, the absolute speed, etc. for his or her own vehicle, and then transmit the determined absolute information on the surrounding vehicles together with the relative information (the relative locations (x, y), the relative velocities (Vx, Vy), the decelerations (Ax, Ay), the rotation speed (Yaw), the rotational angular acceleration (dYaw), etc.) on the surrounding vehicles to the cloud 200 through the communication device 110.

Since each of the surrounding vehicles may be relatively his or her own vehicle, the absolute information and the relative information on the surrounding vehicles determined as described above for each autonomous vehicle is transmitted to the cloud 200.

At this time, the cloud 200 may be a central computer of a control center that is communicatively connected to the autonomous traveling control unit 100 of each autonomous vehicle through the communication device 110.

Meanwhile, when it is determined that deceleration is required based on monitoring information on the surrounding vehicles provided from the autonomous traveling detection unit, or there is a braking request signal provided from the cloud 200, the autonomous traveling control unit 100 may be configured to transmit the braking request signal to the braking control unit 120, performing a regenerative braking by a motor and/or a hydraulic braking by a hydraulic braking device by a braking control of the braking control unit 120.

Figure 4A:
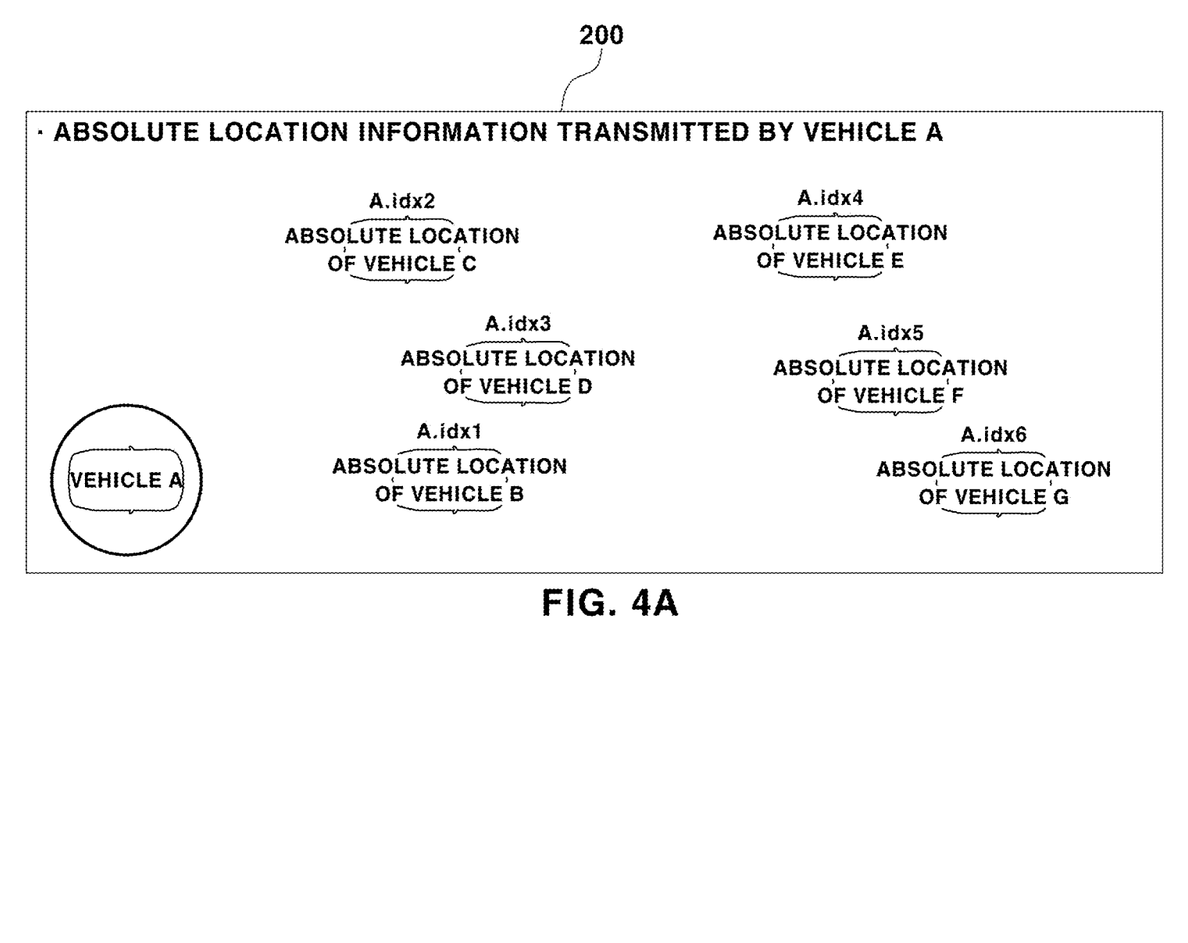
FIG. 4A and FIG. 4B are schematic diagrams showing an example in which the cloud of the configuration of the braking control system for an autonomous vehicle according to an exemplary embodiment of the present disclosure checks an absolute location of each autonomous vehicle.
Figure 4B:
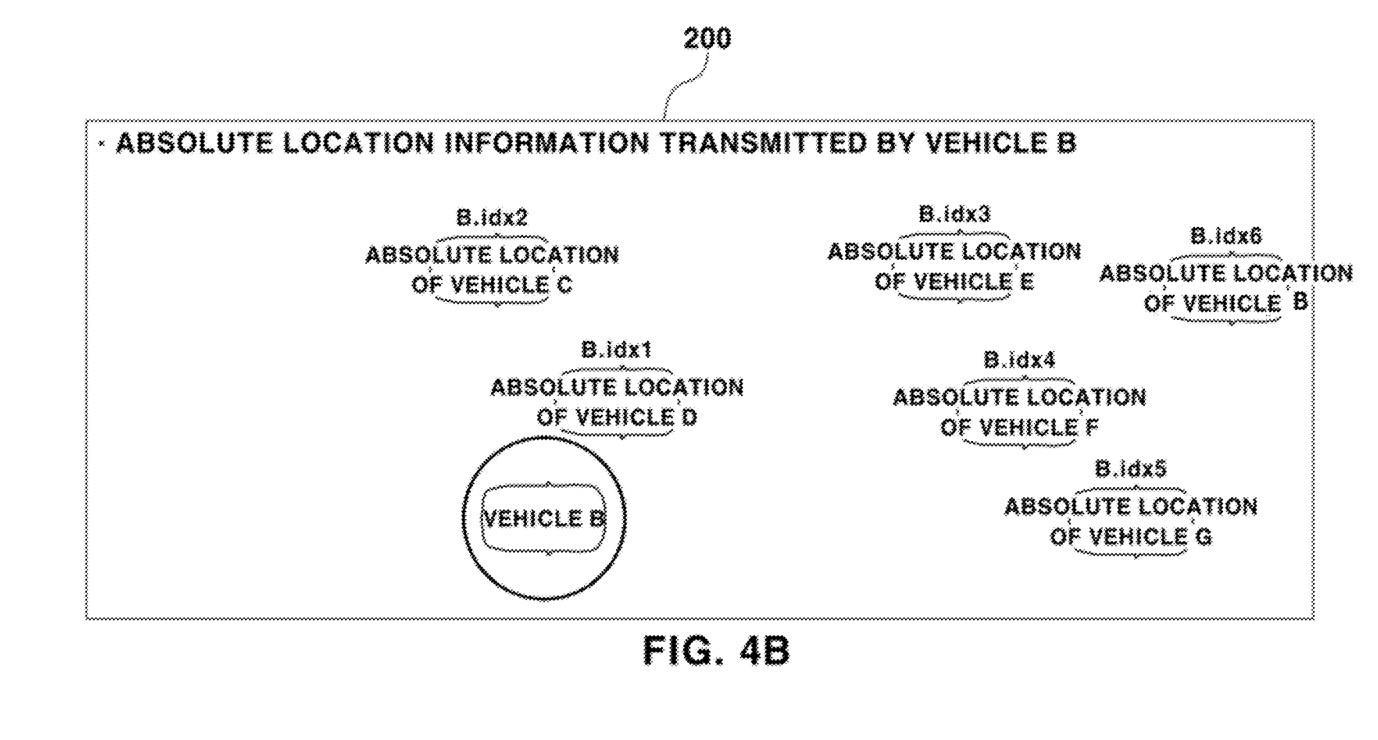

The cloud 200 is configured to identify the absolute locations of each autonomous vehicle based on the absolute information and the relative information on the surrounding vehicles transmitted from the autonomous traveling control unit 100 of each autonomous vehicle.

The cloud 200 may identify the absolute locations of the surrounding vehicles based on the absolute locations of the absolute information transmitted from the autonomous traveling control unit 100 of each autonomous vehicle.

For example, as shown in FIG. 4A, the absolute location information transmitted from the autonomous traveling control unit 100 of the vehicle A to the cloud 200 includes an absolute location of a vehicle B (A.idx1), an absolute location of a vehicle C (A.idx2), an absolute location of a vehicle D (A.idx3), an absolute location of a vehicle E (A.idx4), an absolute location of a vehicle F (A.idx5), an absolute location (A.idx6) of a vehicle G in order from the nearest vehicle from the vehicle A, and on the other hand, as shown in FIG. 4B, the absolute location information transmitted from the autonomous traveling control unit 100 of the vehicle B to the cloud 200 includes an absolute location (B.idx1) of the vehicle D, an absolute location of the vehicle C (B.idx2), an absolute location of the vehicle E (B.idx3), an absolute location of the vehicle F (B.idx4), an absolute location of the vehicle G (B.idx5), etc. in order from the nearest vehicle from the vehicle B (B.idx6).

At the present time, when the cloud 200 checks the absolute locations of the surrounding vehicles, the absolute locations of the surrounding vehicles transmitted from the autonomous traveling control unit 100 of each autonomous vehicle are theoretically the same, so that the vehicles including the same absolute location may be identified as a single vehicle.

For example, because the absolute location (A.idx2) of the vehicle C transmitted from the autonomous traveling control unit 100 of the vehicle A to the cloud 200, and the absolute location (B.idx2) of the vehicle C transmitted from the autonomous traveling control unit 100 of the vehicle B to the cloud 200 are the same, the vehicle C including the same absolute location may be identified as a single vehicle.

However, the absolute locations of the surrounding vehicles transmitted from the autonomous traveling control unit 100 of each autonomous vehicle are theoretically the same, but a difference may occur due to minute errors and noises of the autonomous traveling detection unit of each vehicle.

Figure 5:
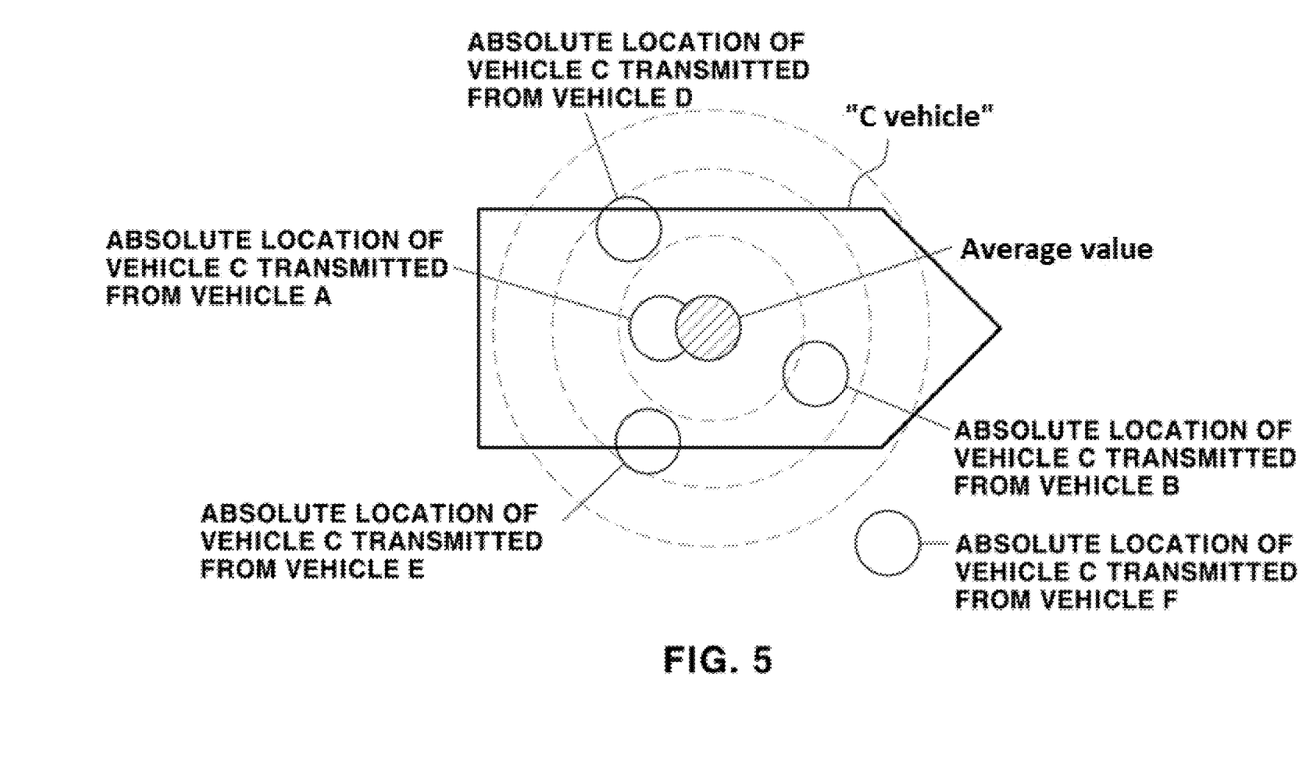
FIG. 5 is a schematic diagram showing a method in which the cloud of the configuration of the braking control system for an autonomous vehicle according to an exemplary embodiment of the present disclosure determines error or failure of an autonomous traveling detection unit of the autonomous vehicle.

Furthermore, the cloud 200 is configured to determine the average and standard deviation of the absolute locations of each autonomous vehicle identified as described above, and then determine the error or failure of the autonomous traveling detection unit of each autonomous vehicle using the determined average and standard deviation of the absolute location.

The cloud 200 may determine the average and standard deviation of the absolute locations of each autonomous vehicle identified as described above, and then as shown in FIG. 5, align the absolute location transmitted from the autonomous traveling control unit of each autonomous vehicle in order from the farthest vehicle from his or her own vehicle based on the average value of the absolute location, and then determine that an autonomous traveling detection unit of the autonomous vehicle having transmitted the absolute location deviating from the average value by a reference distance or more is erroneous and failed.

For example, the cloud 200 may determine the average of the absolute location of the vehicle C transmitted from the autonomous traveling control unit of each autonomous vehicle (e.g., vehicle A, vehicle B, vehicle D, vehicle E, and vehicle F), and then as shown in FIG. 5, align the absolute location of the vehicle C transmitted from the vehicle A, the absolute location of the vehicle C transmitted from the vehicle B, the absolute location of the vehicle C transmitted from the vehicle D, the absolute location of the vehicle C transmitted from the vehicle E, and the absolute location of the vehicle C transmitted from the vehicle F by distance based on the average value of absolute locations (indicated by hatched circles in FIG. 5), and then determine that the autonomous traveling detection unit of the vehicle F having transmitted the absolute location deviating from the average value by the reference distance or more is erroneous and failed.

Furthermore, the cloud 200 is configured to compare an error rate of the autonomous traveling detection unit of the autonomous vehicle having transmitted the absolute location deviating from the average value of the absolute location by the reference distance or more than the reference distance with a preset threshold and determine that the autonomous traveling detection unit of the corresponding autonomous vehicle is failed when the error rate is greater as the comparison result to transmit a failure signal indicating that the autonomous traveling detection unit is abnormal to the autonomous traveling control unit of the corresponding autonomous vehicle.

At the present time, the error rate may be obtained through Equation 1 below, and the error rate may be greater as the autonomous vehicle transmits the absolute location farther away as the average value of the absolute locations.

$$\text{error rate} = \frac{\sum \frac{\text{Distances with average}}{\text{Distances with surrounding vehicles}}}{\text{Nubmer of surrounding vehicles}} \quad \text{Equation 1}$$

On the other hand, the cloud 200 is configured to compare the error rate of the autonomous traveling detection unit of the autonomous vehicle having transmitted the absolute location deviating from the average value of the absolute locations by the reference distance or more with the preset threshold, and transmit an error correction request signal of the autonomous traveling detection unit to the autonomous traveling control unit of the corresponding autonomous vehicle when the error rate is smaller as the comparison result.

Furthermore, the cloud 200 is configured to transmit the failure signal or the error correction request signal together with the braking request signal for decelerating the corresponding autonomous vehicle when transmitting the failure signal or the error correction request signal to the autonomous traveling control unit of the corresponding autonomous vehicle in consideration of the point that the distance with the surrounding vehicles may be gradually reduced due to the failure or error of the autonomous traveling detection unit while the autonomous vehicles are traveling, causing collision accidents.

The cloud 200 is configured to determine an inter-vehicle collision index (distance reduction rate/distance with the leading vehicle) in consideration of the point that the shorter the distance from the surrounding vehicles (the leading vehicles), that is, the higher the distance reduction rate, the higher the probability of collision with the surrounding vehicles, and transmit the braking request signal to the autonomous traveling control unit of the corresponding autonomous vehicle for decelerating the corresponding autonomous vehicle when the inter-vehicle collision index is greater than a vehicle safety threshold.

Meanwhile, the autonomous traveling control unit 100 may be configured to check whether the autonomous traveling detection unit is abnormal using a preset logic when receiving the failure signal indicating that the autonomous traveling detection unit is abnormal from the cloud 200, and display a warning to switch to the manual operation on a display 130 mounted in the vehicle when it is confirmed that the autonomous traveling detection unit is failed as the checking result.

Furthermore, when the autonomous traveling control unit 100 receives the error correction request signal of the autonomous traveling detection unit from the cloud 200, the autonomous traveling control unit 100 is configured to perform correction such as adjusting an offset value of the autonomous traveling detection unit using the preset logic based on the error information included in the error correction request signal.

Furthermore, when the autonomous traveling control unit 100 receives the braking request signal from the cloud 200, the autonomous traveling control unit 100 may transmit the braking request signal to the braking control unit 120 based on the braking request signal including a braking amount for preventing collision, performing the regenerative braking by the motor and/or the hydraulic braking by the hydraulic braking device by the braking control of the braking control unit 120, and thus easily preventing collision accidents while the autonomous vehicle is traveling.

Here, a braking control method for an autonomous vehicle according to an exemplary embodiment of the present disclosure based on the above configuration will be sequentially described as follows.

Figure 6:
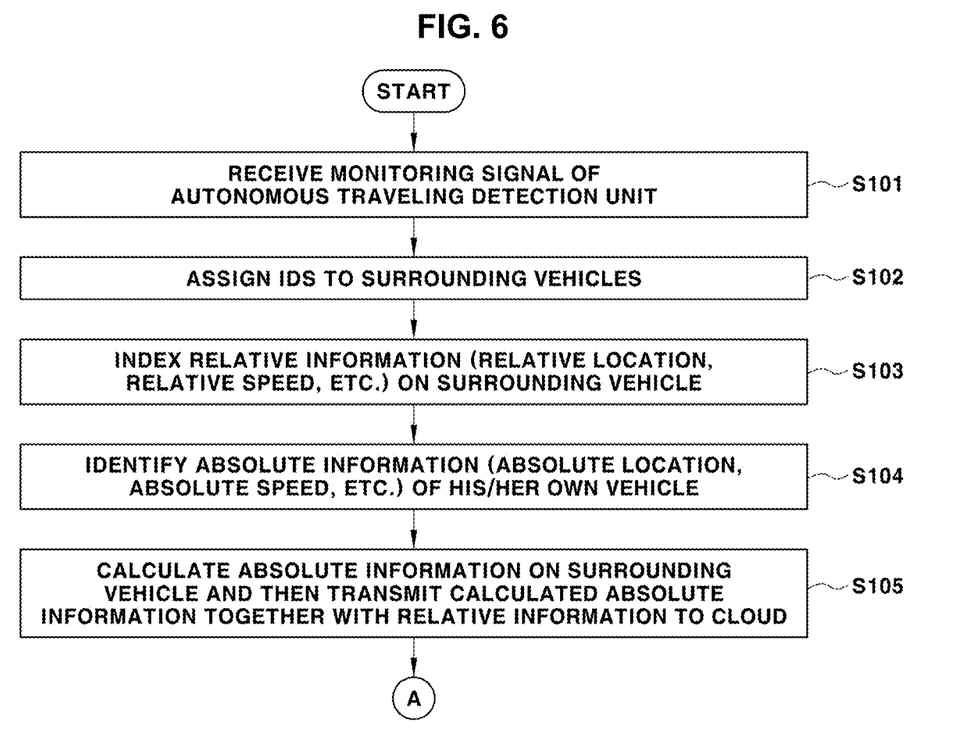
FIG. 6, FIG. 7, and FIG. 8 are flowcharts sequentially showing a braking control method for an autonomous vehicle according to an exemplary embodiment of the present disclosure.
Figure 7:
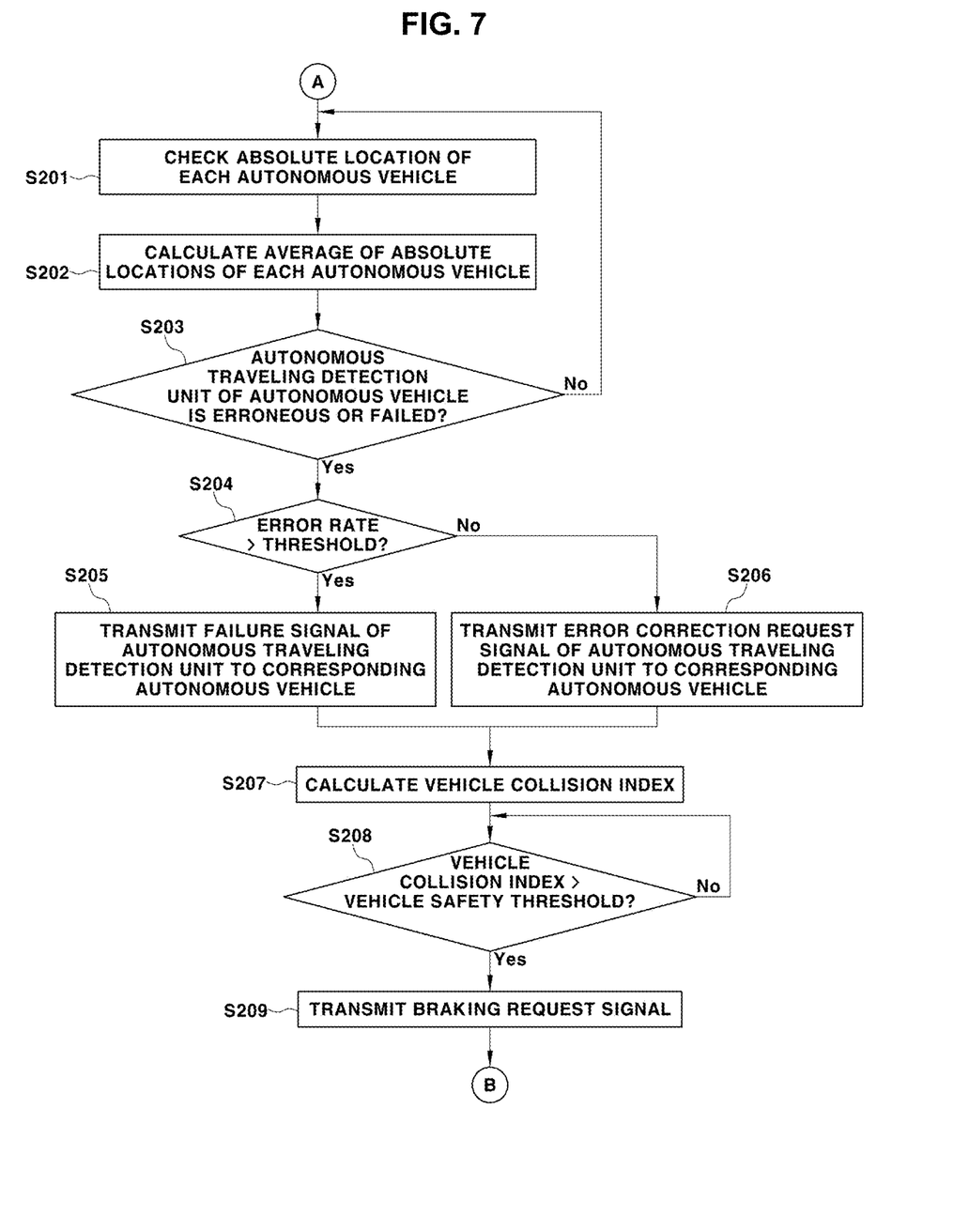
Figure 8:
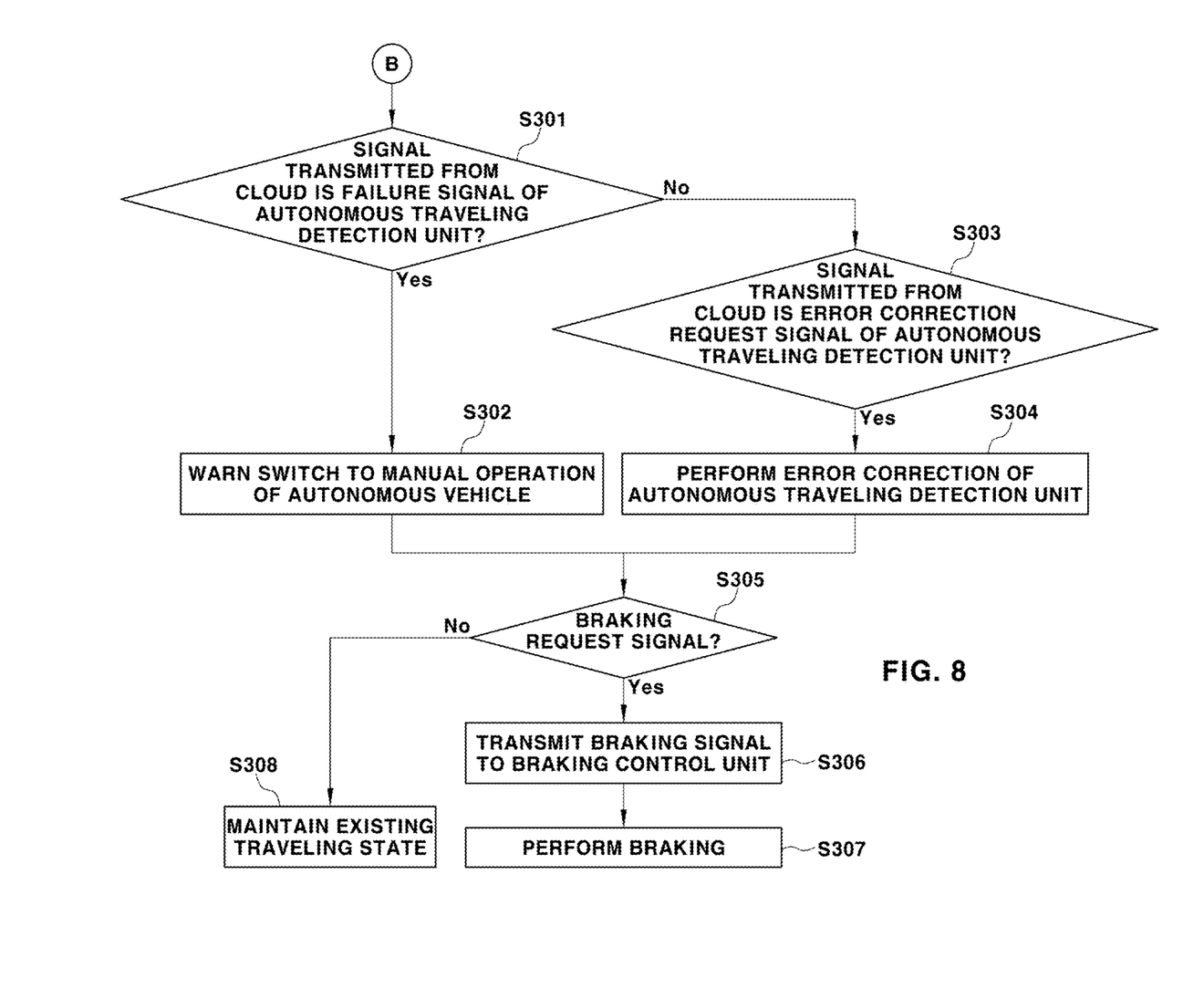

FIG. 6, FIG. 7, and FIG. 8 are flowcharts showing the braking control method for an autonomous vehicle according to an exemplary embodiment of the present disclosure, in which FIG. 6 and FIG. 8 show operations performed in the autonomous traveling control units of the autonomous vehicles, and FIG. 7 shows an operation performed in the cloud.

First, while the autonomous vehicles are traveling, the autonomous traveling control unit 100 of each autonomous vehicle receives the monitoring signal for surrounding vehicles (S101).

Subsequently, the autonomous traveling control unit 100 assigns an identification (ID) to each surrounding vehicle with respect to his or her own vehicle based on the received monitoring signal (S102), and indexes the relative information including the relative locations (x, y), the relative speeds (Vx, Vy), the decelerations (Ax, Ay), the rotation speed (Yaw), the rotational angular acceleration (dYaw), etc. For each surrounding vehicle with the ID assigned (S103).

For example, as shown in FIG. 2, the autonomous traveling control unit 100 assigns the idx1 to the vehicle B (surrounding vehicle), assigns the idx2 to the vehicle C (surrounding vehicle), and assigns the idx3 to the vehicle D (surrounding vehicle) in order from the nearest vehicle from the vehicle A (his or her own vehicle), and then identify the relative information including the relative locations (x, y), the relative speeds (Vx, Vy), the decelerations (Ax, Ay), the rotation speed (Yaw), the rotational angular acceleration (dYaw), etc. For each surrounding vehicle with the ID assigned and indexes each relative information in a predetermined order.

Subsequently, the autonomous traveling control unit 100 identifies the absolute location of his or her own vehicle which may be checked based on the signal provided by the GPS 102 and the like of his or her own vehicle, and the absolute information including the absolute vehicle speed of his or her own vehicle which may be checked based on the detection signal provided from the vehicle speed sensor 106 (S104).

Next, the autonomous traveling control unit 100 determines the absolute information on the surrounding vehicles using the general rotation matrix based on the relative information on the surrounding vehicles and the absolute information on his or her own vehicle, and then, transmits the determined absolute information on the surrounding vehicles together with the relative information on the surrounding vehicle to the cloud 200 (S105).

The autonomous traveling control unit 100 determines the absolute locations (x_g, y_g), the absolute velocities (Vx_g, Vy_g), the absolute accelerations (Ax_g, Ay_g), etc. As the absolute information on the surrounding vehicles using the general rotation matrix based on the relative information including the relative locations (x, y), the relative velocities (Vx, Vy), and the decelerations (Ax, Ay) on the surrounding vehicles, and the absolute information including absolute location and absolute speed of his or her own vehicle, and then transmits the determined absolute information on the surrounding vehicles together with the relative information (the relative locations (x, y), the relative speeds (Vx, Vy), the decelerations (Ax, Ay), the rotation speed (Yaw), the rotational angular acceleration (dYaw), etc.) on the surrounding vehicles to the cloud 200 through the communication device 110.

At the present time, because each of the surrounding vehicles may be relatively his or her own vehicle, the absolute information and the relative information on the surrounding vehicles determined as described above for each autonomous vehicle are transmitted to the cloud 200.

Next, the cloud 200 checks the absolute locations of each autonomous vehicle based on the absolute information and relative information on the surrounding vehicles transmitted from the autonomous traveling control unit 100 of each autonomous vehicle (S201).

At the present time, when the cloud 200 checks the absolute locations of the surrounding vehicles, the absolute locations of the surrounding vehicles transmitted from the autonomous traveling control unit 100 of each autonomous vehicle are theoretically the same, so that the vehicles including the same absolute location may be identified as a single vehicle.

For example, because the absolute location (A.idx2) of the vehicle C transmitted from the autonomous traveling control unit 100 of the vehicle A to the cloud 200, and the absolute location (B.idx2) of the vehicle C transmitted from the autonomous traveling control unit 100 of the vehicle B to the cloud 200 are the same, the vehicle C including the same absolute location may be identified as a single vehicle.

However, the absolute locations of the surrounding vehicles transmitted from the autonomous traveling control unit 100 of each autonomous vehicle are theoretically the same, but a difference may occur due to minute errors and noises of the autonomous traveling detection unit of each vehicle.

Next, the cloud 200 determines the average and standard deviation of the absolute location of each autonomous vehicle identified as described above (S202), and determines whether the autonomous traveling detection unit of each autonomous vehicle is erroneous and failed using the determined average and standard deviation of the absolute location (S203).

For example, the cloud 200 may determine the average of the absolute location of the vehicle C transmitted from the autonomous traveling control unit of each autonomous vehicle (e.g., vehicle A, vehicle B, vehicle D, vehicle E, and vehicle F), and then as shown in FIG. 5, align the absolute location of the vehicle C transmitted from the vehicle A, the absolute location of the vehicle C transmitted from the vehicle B, the absolute location of the vehicle C transmitted from the vehicle D, the absolute location of the vehicle C transmitted from the vehicle E, and the absolute location of the vehicle C transmitted from the vehicle F by distance based on the average value of absolute locations (indicated by hatched circles in FIG. 5), and then determine that the autonomous traveling detection unit of the vehicle F having transmitted the absolute location deviating from the average value by the reference distance or more is erroneous and failed.

Subsequently, the cloud 200 compares the error rate of the autonomous traveling detection unit of the autonomous vehicle having transmitted the absolute location deviating from the average value of the absolute locations by the reference distance or more with the preset threshold (S204).

At the present time, the error rate may be obtained through Equation 1 above, and the error rate may be greater as the autonomous vehicle transmits the absolute location farther away from the average value of the absolute locations.

As the comparison result in operation S204, when the error rate is greater, the cloud 200 determines that the autonomous traveling detection unit of the corresponding autonomous vehicle is failed, and transmits the failure signal indicating that the autonomous traveling detection unit is abnormal to the autonomous traveling control unit of the corresponding autonomous vehicle (S205).

On the other hand, as the comparison result in operation S204, when the error rate is smaller, the cloud 200 determines that the error correction of the autonomous traveling detection unit of the corresponding autonomous vehicle is required to transmit the error correction request signal of the autonomous traveling detection unit to the autonomous traveling control unit of the corresponding autonomous vehicle (S206).

At the present time, the cloud 200 transmits the failure signal or the error correction request signal together with the braking request signal for decelerating the corresponding autonomous vehicle when transmitting the failure signal or the error correction request signal to the autonomous traveling control unit of the corresponding autonomous vehicle in consideration of the point that the distance with the surrounding vehicles may be gradually reduced due to the failure or error of the autonomous traveling detection unit while the autonomous vehicles are traveling, causing collision accidents.

The cloud 200 determines the inter-vehicle collision index (distance reduction rate/distance with the leading vehicle) in consideration of the point that the shorter the distance from the surrounding vehicles (the leading vehicles), that is, the higher the distance reduction rate, the higher the probability of collision with the surrounding vehicles (S207), compares the inter-vehicle collision index with the preset vehicle safety threshold (S208), and then transmit the braking request signal to the autonomous traveling control unit of the corresponding autonomous vehicle for decelerating the corresponding autonomous vehicle when the inter-vehicle collision index is greater than the vehicle safety threshold (S209).

Next, the autonomous traveling control unit 100 of the autonomous vehicle checks whether to receive the failure signal of the autonomous traveling detection unit from the cloud 200 (S301), and checks whether the autonomous traveling detection unit is abnormal using the preset logic when it is confirmed that the failure signal of the autonomous traveling detection unit has been received, and then displays a warning to switch to the manual operation on the display 130 mounted in the vehicle when it is confirmed that the autonomous traveling detection unit is failed as the checking result (S302)

On the other hand, the autonomous traveling control unit 100 of the autonomous vehicle checks whether to receive the error correction request signal of the autonomous traveling detection unit from the cloud 200 (S303), and performs correction such as adjusting the offset value of the autonomous traveling detection unit using the preset logic based on the error information included in the error correction request signal when it is confirmed that the error correction request signal of the autonomous traveling detection unit has been received (S304).

At the present time, as described above, the cloud 200 transmits the failure signal or the error correction request signal together with the braking request signal for decelerating the corresponding autonomous vehicle when transmitting the failure signal or the error correction request signal to the autonomous traveling control unit of the corresponding autonomous vehicle in consideration of the point that the distance with the surrounding vehicles may be gradually reduced due to the failure or error of the autonomous traveling detection unit while the autonomous vehicles are traveling, causing collision accidents.

Accordingly, the autonomous traveling control unit 100 checks whether to receive the braking request signal from the cloud 200 (S305), and transmits the braking request signal to the braking control unit 120 when it is confirmed that the braking request signal including the braking amount for preventing collision has been received (S306).

Accordingly, it is possible to perform the regenerative braking by the motor and/or the hydraulic braking by the hydraulic braking device by the braking control of the braking control unit 120 (S307), and thus easily prevent the collision accidents while the autonomous vehicle is traveling.

Of course, when the autonomous traveling control unit 100 does not receive the braking request signal from the cloud 200, the corresponding autonomous vehicle maintains the existing traveling state (speed and the like) (S308).

As described above, it is possible to transmit the information on the surrounding vehicles monitored by the autonomous traveling-related sensor of each vehicle while the autonomous vehicles are traveling to the cloud, and transmit the braking induction signal to the specific vehicle when the cloud determines that the distance with the leading vehicle of the specific vehicle has reached the reference distance or less at which braking is required so that the specific vehicle can be braked, easily preventing the safety accidents such as collision with the leading vehicle.

Furthermore, when the specific vehicle receives the braking induction signal from the cloud, the owner of the specific vehicle can recognize the occurrence of error or failure of the autonomous traveling-related sensor to take the follow-up maintenance actions.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A braking control system for autonomous vehicles, the braking control system comprising:
    an autonomous traveling detector mounted on each of the autonomous vehicles to monitor surrounding vehicles required for autonomous traveling;
    an autonomous traveling controller mounted on each of the autonomous vehicles, and configured to determine absolute information including an absolute location of the autonomous vehicles based on monitoring information of the autonomous traveling detector, and configured to transmit the absolute information so determined to a cloud; and
    the cloud configured to determine whether the autonomous traveling detector of each autonomous vehicle is erroneous and failed using an average value of the absolute locations of the autonomous vehicles, and then transmit a failure signal or an error correction request signal of the autonomous traveling detector together with a braking request signal to the autonomous traveling controller of the autonomous vehicles which have failed,
    wherein the autonomous traveling controller is configured to determine absolute information including absolute locations and absolute speeds of the surrounding vehicles using a rotation matrix based on relative information including relative locations and relative speeds of the surrounding vehicles and absolute information including an absolute location and an absolute speed of one's own vehicle, and then to transmit the determined absolute information on the surrounding vehicles together with the relative information on the surrounding vehicles to the cloud, and
    wherein the cloud is configured to align the absolute locations transmitted by the autonomous traveling controller of the autonomous vehicles by distance relative to the average value of the absolute locations, and then to conclude that an autonomous traveling detector of any of the autonomous vehicles having transmitted an absolute location deviating from the average value by a reference distance or more than the reference distance is erroneous or failed.

2. The braking control system of claim 1, wherein when an error rate of the autonomous traveling detector of the autonomous vehicle having transmitted the absolute location deviating from the average value of the absolute location by the reference distance or more than the reference distance is greater than a preset threshold, the cloud is configured to conclude that the autonomous traveling detector of a corresponding autonomous vehicle is failed to transmit a failure signal of the autonomous traveling detector to the autonomous traveling controller of the corresponding autonomous vehicle.

3. The braking control system of claim 1, wherein when an error rate of the autonomous traveling detector of the autonomous vehicle having transmitted the absolute location deviating from the average value of the absolute location by the reference distance or more than the reference distance is smaller than a preset threshold, the cloud is configured to transmit the error correction request signal of the autonomous traveling detector to the autonomous traveling controller of the corresponding autonomous vehicle.

4. The braking control system of claim 1, wherein the cloud is configured to determine an inter-vehicle collision index, and transmit the braking request signal to the autonomous traveling controller of a corresponding autonomous vehicle when the inter-vehicle collision index is greater than a vehicle safety threshold, and
wherein the inter-vehicle collision index is determined by distance reduction rate divided by distance with a leading vehicle.

5. The braking control system of claim 1, wherein when the autonomous traveling controller receives the failure signal of the autonomous traveling detector from the cloud, the autonomous traveling controller is configured to display a warning to switch to a manual operation on a display mounted in the autonomous vehicle.

6. The braking control system of claim 1, wherein when the autonomous traveling controller receives the error correction request signal of the autonomous traveling detector from the cloud, the autonomous traveling controller is configured to correct an offset value of the autonomous traveling detector based on error information included in the error correction request signal.

7. The braking control system of claim 1, wherein when the autonomous traveling controller receives the braking request signal from the cloud, the autonomous traveling controller is configured to transmit the braking request signal to a braking controller to perform a regenerative braking by a motor and a hydraulic braking by a hydraulic braking device.

8. A braking control method for autonomous vehicles, the method comprising:
monitoring, by an autonomous traveling detector mounted on each of the autonomous vehicles, surrounding vehicles required for autonomous traveling;
determining, by an autonomous traveling controller mounted on each of the autonomous vehicles, absolute information including absolute locations of each autonomous vehicle based on monitoring information of the autonomous traveling detector and transmitting the determined absolute information to a cloud; and
determining, by the cloud, whether the autonomous traveling detector of each autonomous vehicle is erroneous or failed using an average value of the absolute locations of each autonomous vehicle, and then transmitting a failure signal or an error correction request signal of the autonomous traveling detector together with a braking request signal to the autonomous traveling controller of a corresponding autonomous vehicle,
wherein the autonomous traveling controller is configured to determine absolute information including absolute locations and absolute speeds of the surrounding vehicles using a rotation matrix based on relative information including relative locations and relative speeds of the surrounding vehicles and absolute information including an absolute location and an absolute speed of one's own vehicle, and then to transmit the determined absolute information on the surrounding vehicles together with the relative information on the surrounding vehicles to the cloud, and
wherein when determining whether the autonomous traveling detector of each autonomous vehicle is erroneous or failed,
the absolute locations transmitted by the autonomous traveling controller of each autonomous vehicle are aligned by distance based on the average value of the absolute locations of each autonomous vehicle, and then the cloud is configured to conclude that an autonomous traveling detector of an autonomous vehicle having transmitted an absolute location deviating from the average value by a reference distance or more than the reference distance is erroneous or failed.

9. The method of claim 8,
wherein when an error rate of the autonomous traveling detector of the autonomous vehicle having transmitted the absolute location deviating from the average value of the absolute location by the reference distance or more than the reference distance is greater than a preset threshold, the cloud is configured to conclude that the autonomous traveling detector of the corresponding autonomous vehicle is failed.

10. The method of claim 8,
wherein when an error rate of the autonomous traveling detector of the autonomous vehicle having transmitted the absolute location deviating from the average value of the absolute location by the reference distance or more than the reference distance is smaller than a preset threshold, the cloud is configured to conclude that an error correction of the autonomous traveling detector for the autonomous traveling controller of the corresponding autonomous vehicle is required.

11. The method of claim 8,
wherein when the cloud transmits the braking request signal to the autonomous traveling controller,
the cloud determines an inter-vehicle collision index, and transmits the braking request signal to the autonomous traveling controller of the corresponding autonomous vehicle when the inter-vehicle collision index is greater than a vehicle safety threshold, and
wherein the inter-vehicle collision index is determined by distance reduction rate divided by distance with a leading vehicle.

12. The method of claim 8, further including:
displaying a warning to switch to a manual operation on a display mounted in the autonomous vehicle when the autonomous traveling controller receives a failure signal of the autonomous traveling detector from the cloud.

13. The method of claim 8, further including:

correcting, by the autonomous traveling controller, an offset value of the autonomous traveling detector based on error information included in the error correction request signal when the autonomous traveling controller receives the error correction request signal of the autonomous traveling detector from the cloud.

14. The method of claim 8, further including:

transmitting, by the autonomous traveling controller, the braking request signal to a braking controller to perform a regenerative braking by a motor and a hydraulic braking by a hydraulic braking device when the autonomous traveling controller receives the braking request signal from the cloud.

15. A braking control system for an autonomous vehicles, the braking control system comprising:

an autonomous traveling detector mounted on each of the autonomous vehicles to monitor surrounding vehicles required for autonomous traveling;

an autonomous traveling controller mounted on each of the autonomous vehicles, and configured to determine absolute information including an absolute location of the autonomous vehicles based on monitoring information of the autonomous traveling detector, and configured to transmit the absolute information so determined to a cloud; and the cloud configured to determine whether the autonomous traveling detector of each autonomous vehicle is erroneous and failed using an average value of the absolute locations of the autonomous vehicles, and then transmit a failure signal or an error correction request signal of the autonomous traveling detector together with a braking request signal to the autonomous traveling controller of the autonomous vehicles which have failed, wherein the cloud is configured to align the absolute locations transmitted by the autonomous traveling controller of the autonomous vehicles by distance relative to the average value of the absolute locations, and then to conclude that an autonomous traveling detector of any of the autonomous vehicles having transmitted an absolute location deviating from the average value by a reference distance or more than the reference distance is erroneous or failed.

16. A braking control method for an autonomous vehicles, the method comprising:

monitoring, by an autonomous traveling detector mounted on each of the autonomous vehicles, surrounding vehicles required for autonomous traveling;

determining, by an autonomous traveling controller mounted on each of the autonomous vehicles, absolute information including absolute locations of each autonomous vehicle based on monitoring information of the autonomous traveling detector and transmitting the determined absolute information to a cloud; and determining, by the cloud, whether the autonomous traveling detector of each autonomous vehicle is erroneous or failed using an average value of the absolute locations of each autonomous vehicle, and then transmitting a failure signal or an error correction request signal of the autonomous traveling detector together with a braking request signal to the autonomous traveling controller of a corresponding autonomous vehicle, wherein when determining whether the autonomous traveling detector of each autonomous vehicle is erroneous or failed, the absolute locations transmitted by the autonomous traveling controller of each autonomous vehicle are aligned by distance based on the average value of the absolute locations of each autonomous vehicle, and then the cloud is configured to conclude that an autonomous traveling detector of an autonomous vehicle having transmitted an absolute location deviating from the average value by a reference distance or more than the reference distance is erroneous or failed.

\* \* \* \* \*